United States Patent
Chang et al.

(10) Patent No.: US 8,522,114 B2
(45) Date of Patent: Aug. 27, 2013

(54) MEMORY CONTROLLER AND MEMORY SYSTEM

(75) Inventors: Woo tae Chang, Yongin-si (KR); Yong tae Yim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 553 days.

(21) Appl. No.: 12/768,047

(22) Filed: Apr. 27, 2010

(65) Prior Publication Data

US 2010/0281342 A1 Nov. 4, 2010

(30) Foreign Application Priority Data

Apr. 30, 2009 (KR) .................. 10-2009-0038358

(51) Int. Cl.
*G11C 29/00* (2006.01)
(52) U.S. Cl.
USPC ......................................................... 714/773
(58) Field of Classification Search
USPC ......................................................... 714/773
See application file for complete search history.

(56) References Cited

U.S. PATENT DOCUMENTS

| | | | |
|---|---|---|---|
| 6,438,706 B1 * | 8/2002 | Brown ........................... | 714/6.32 |
| 2004/0117688 A1 * | 6/2004 | Vainsencher et al. ........... | 714/42 |
| 2008/0147964 A1 * | 6/2008 | Chow et al. .................... | 711/103 |
| 2008/0148124 A1 * | 6/2008 | Zhang et al. ................... | 714/752 |
| 2008/0222491 A1 * | 9/2008 | Lee et al. ....................... | 714/763 |
| 2008/0229000 A1 * | 9/2008 | Kim ............................... | 711/103 |
| 2010/0050053 A1 * | 2/2010 | Wilson et al. .................. | 714/773 |

FOREIGN PATENT DOCUMENTS

| | | |
|---|---|---|
| JP | 09251427 A | 9/1997 |
| JP | 2000020409 A | 1/2000 |
| JP | 2001014888 A | 1/2001 |
| KR | 1020060023427 A | 3/2006 |

* cited by examiner

*Primary Examiner* — Michael Maskulinski
*Assistant Examiner* — Neil Miles
(74) *Attorney, Agent, or Firm* — Volentine & Whitt, PLLC

(57) ABSTRACT

A memory system is provided. The memory system includes a nonvolatile memory and a controller. The nonvolatile memory includes a memory cell array and a read/write circuit configured to perform a read/write operation in the memory cell array during a read operation. The controller is configured to receive the read data from the nonvolatile memory, perform an error detection and correction operation on the read data. Upon detecting an error in a received portion of the read data, the controller is further configured to halt further transmission of the read data from the nonvolatile memory, perform the error detection and correction operation on the received portion of the read data to correct the detected error. After correcting the detected error in the received portion of the read data, the controller is configured to resume transmission of the read data from the nonvolatile memory.

8 Claims, 13 Drawing Sheets

MEMORY CONTROLLER AND MEMORY SYSTEM

CROSS-REFERENCE TO RELATED APPLICATIONS

This U.S. non-provisional patent application claims priority under 35 U.S.C. §119 of Korean Patent Application No. 10-2009-0038358, filed on Apr. 30, 2009, the entire contents of which are hereby incorporated by reference.

BACKGROUND

The present disclosure relates to semiconductor devices, and more particularly, to a memory controller and a memory system including same.

Semiconductor memory devices may be classified as volatile and nonvolatile in their operative nature. Volatile memory devices lose stored data in the absence of applied power. Examples of volatile memory devices include static random access memory (SRAM) devices, dynamic random access memory (DRAM) devices, and synchronous dynamic random access memory (SDRAM) devices.

Nonvolatile memory devices retain stored data in the absence of applied power. Examples of the nonvolatile memory devices include read-only memory (ROM) devices, programmable read-only memory (PROM) devices, erasable programmable read-only memory (EPROM) devices, electrically erasable programmable read-only memory (EEPROM) devices, flash memory devices, phase-change random access memory (PRAM) devices, magnetic random access memory (MRAM) devices, resistive random access memory (RRAM) devices, and ferroelectric random access memory (FRAM) devices. The flash memory devices may be further classified as NOR-type flash memory devices and NAND-type flash memory devices.

In a memory system including a semiconductor memory, a memory controller is commonly provided to control the overall operation of a semiconductor memory within the memory system. Memory controllers typically include an interface facilitating communication between a host and the semiconductor memory, and a logic unit controlling the semiconductor memory in response to commands received from the host.

SUMMARY

Embodiments of the inventive concept provide a memory controller capable of providing improved error detection and correction capabilities and a memory system including same.

In some embodiments of the inventive concept, a memory system includes a nonvolatile memory including a memory cell array and a read/write circuit configured to retrieve read data stored in the memory cell array during a read operation, and a controller configured to receive the read data from the nonvolatile memory, perform an error detection and correction operation on the read data. Upon detecting an error in a received portion of the read data, the controller is further configured to halt further transmission of the read data from the nonvolatile memory, perform the error detection and correction operation on the received portion of the read data to correct the detected error, and after correcting the detected error in the received portion of the read data, resuming transmission of the read data from the nonvolatile memory.

In some embodiments, the read/write circuit is configured to retrieve the read data on a first unit basis, the controller performs the error detection operation on the received portion of the read data on a second unit basis, and the first unit is larger than the second unit.

In other embodiments, the received portion of the read data includes at least one second unit sized block of the read data.

In further embodiments, the controller is further configured to receive data corresponding to a detected error of the received portion of the read data on a third unit basis, the second unit being larger than the third unit, and correct the detected error in the received data corresponding to the detected error.

In still further embodiments, the controller is further configured to generate error-corrected read data following correction of the detected error and provide the error-corrected read data to the read/write circuit on the third unit basis.

In still further embodiments, the controller is further configured to receive complete read data following resumption of transmission of the read data, and upon receipt of the complete read data the controller is configured to perform a copyback operation in the nonvolatile memory.

In still further embodiments, the controller includes an error correction block configured to detect whether the received portion of the read data contains an error and activating a wait signal upon detecting an error in the received portion of the data, and a state machine configured to halt the transmission of read data in response to the wait signal.

In still further embodiments, the error correction block is further configured upon detecting an error in the received portion of the data to provide error position information related to the detected error to the state machine, and the state machine is further configured to correct the detected error using the error position information.

In still further embodiments, the state machine is further configured following correction of the detected error to transmit a return control signal to the error correction block indicating correction of the detected error.

In still further embodiments, the detected error includes a number of detected errors, and the error correction block is further configured to count a number of return control signal transmissions, and indicate when the counted number of return control signal transmissions is equal to the number of detected errors.

In still further embodiments, the nonvolatile memory and the controller are implemented to form a solid state drive (SSD).

In some embodiments of the inventive concept, a memory system includes a nonvolatile memory including a memory cell array and a read/write circuit configured to retrieve read data stored on a page basis in the memory cell array during a read operation, wherein the page of read data comprises a plurality of N segments and a corresponding plurality of N parities respectively derived from the plurality of N segments, and a controller configured to receive the page of read data from the nonvolatile memory as transmitted on a segment by segment basis, and perform an error detection and correction operation on the read data on the segment by segment basis for each one of the plurality of N segments. Upon detecting an error in an Mth segment of the plurality of N segments of the read data, where M is less than N, the controller is further configured to halt further transmission of the remaining N-M segments of the read data from the nonvolatile memory, perform the error detection and correction operation on the Mth segment to correct the detected error, and after correcting the detected error in the Mth segment, resuming transmission of the page of read data from the nonvolatile memory.

In some embodiments, the controller is further configured to receive data corresponding to the detected error of the Mth segment on a predetermined unit basis, a size of the predetermined unit is less than a segment of the N segments, and correcting the detected error in the received data corresponding to the detected error.

In other embodiments, the controller is further configured to generate an error-corrected data following correction of the detected error and provide the error-corrected data to the read/write circuit.

In further embodiments, the controller is further configured to receive remaining ones of the plurality of N segments following resumption of transmission of the read data, and upon receipt of all of the plurality of N segments the controller is configured to perform a copy-back operation in the nonvolatile memory.

In still further embodiments, the controller includes an error correction block configured to detect whether the Mth segment of the read data contains an error and activating a wait signal upon detecting an error in the Mth segment, and a state machine configured to halt the transmission of the read data in response to the wait signal.

In still further embodiments, the error correction block is further configured upon detecting an error in the Mth segment to provide error position information related to the detected error to the state machine, and the state machine is further configured to correct the detected error using the error position information.

In still further embodiments, the state machine is further configured following correction of the detected error to transmit a return control signal to the error correction block indicating correction of the detected error.

In still further embodiments, the detected error includes a number of detected errors, and the error correction block is further configured to count a number of return control signal transmissions, and indicate when the counted number of return control signal transmissions is equal to the number of detected errors.

In some embodiments of the inventive concept, a method is provided for operating a memory system including a controller and a nonvolatile memory device. The method includes halting a data reading from the nonvolatile memory device when an error is detected, correcting the detected error, and resuming the data reading after the detected error is corrected. The data reading is performed on a first unit basis sequentially, and the detected error is corrected by randomly accessing the nonvolatile memory device on a second unit basis less than the first unit

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION OF THE EMBODIMENTS

Preferred embodiments of the inventive concept will be described below in more detail with reference to the accompanying drawings. The inventive concept may, however, be embodied in different forms and should not be construed as being limited to only the illustrated embodiments. Rather, these embodiments are presented as teaching examples so that this disclosure will be thorough and complete, and will fully convey the scope of the inventive concept to those skilled in the art. Throughout the written description and drawings, like reference numbers and labels are used to denote like or similar elements.

Figure 1:
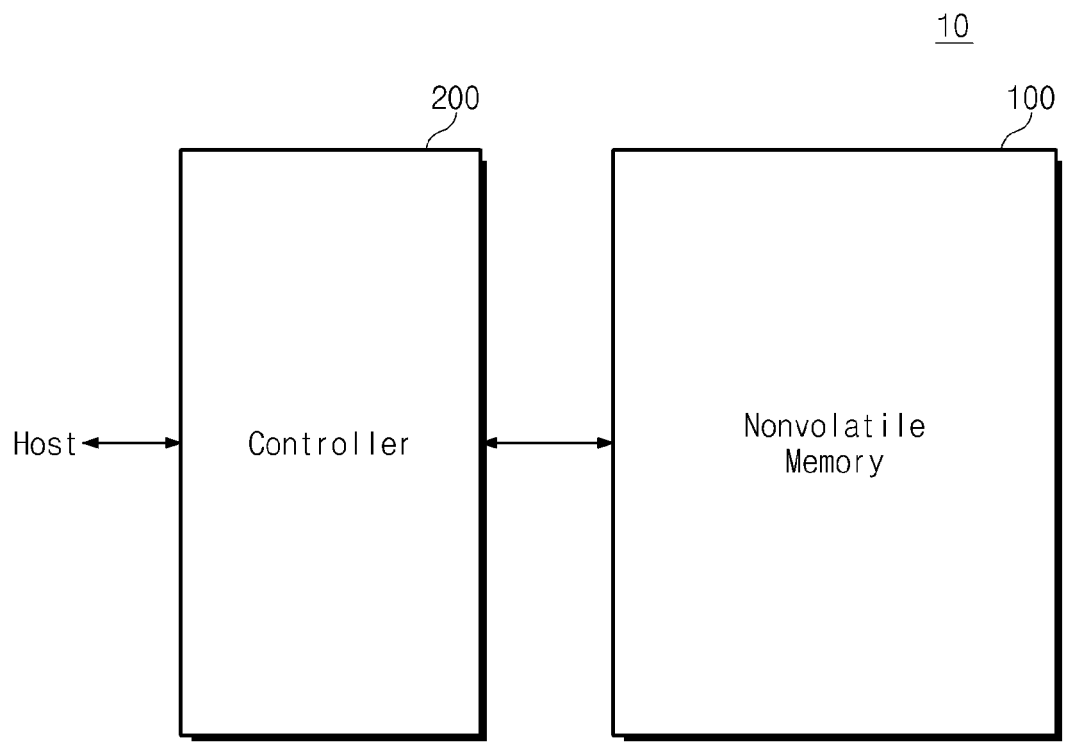
FIG. 1 is a block diagram of a memory system according to an embodiment of the inventive concept.

FIG. 1 is a block diagram of a memory system 10 according to an embodiment of the inventive concept. Memory system 10 generally comprises a nonvolatile memory 100 and a controller 200.

The nonvolatile memory 100 may include a memory cell array for storing data, a read/write circuit for reading/writing data from/in the memory cell array, an address decoder for decoding an address received from an external device and transferring the same to the read/write circuit, and a control logic circuit for controlling an overall operation of the nonvolatile memory 100. The nonvolatile memory 100 according to an exemplary embodiment will be described later in detail with reference to FIG. 2.

The controller 200 is connected between a host and the nonvolatile memory 100. The controller 200 is configured to access the nonvolatile memory 100 in response to a command (e.g., a request) from the host. For example, the controller 200 is configured to control read/write/erase operations within the nonvolatile memory 100. As another example, the controller 200 is configured to provide an interface between the nonvolatile memory 100 and the host. As another example, the controller 200 is configured to drive firmware controlling the nonvolatile memory 100. Various embodiments of the controller 200 will be described later in some additional detail with reference to FIG. 3.

The nonvolatile memory 100 and the controller 200 may be integrated into a single semiconductor device. As an example, the nonvolatile memory 100 and the controller 200 may be integrated into a single semiconductor device that constitutes a so-called memory card. For example, the nonvolatile memory 100 and the controller 200 may be integrated to constitute a PC card (e.g., PCMCIA (Personal Computer Memory Card International Association)), a compact flash card (CF), a smart media card (SM/SMC), a memory stick, a multimedia card (e.g., MMC, RS-MMC and MMCmicro), a SD card (e.g., SD, miniSD, and microSD), or a universal flash storage (UFS).

As another example, the nonvolatile memory 100 and the controller 200 may be integrated into a single semiconductor device to constitute a solid state drive (SSD). For example, the SSD may include a storage device that is configured to store data in a semiconductor memory. When the memory system 10 is used as an SSD, the operation speed of the host connected to the memory system 10 may increase remarkably.

As another example, the memory system 10 may be applicable to computers, portable computers, laptop computers, UMPCs (Ultra Mobile PCs), net-books, PDAs, web tablets, wireless phones, mobile phones, smart phones, digital cameras, digital audio recorders, digital audio players, digital picture recorders, digital picture players, digital video recorders, digital video players, devices capable of transmitting/receiving information in wireless environments, one of various electronic devices constituting a home network, one of various electronic devices constituting a computer network, one of various electronic devices constituting a telematics network, or one of various components constituting a computational system (e.g., an SSD and a memory card).

As another example, the nonvolatile memory 100 or the memory system 10 may be mounted in various types of packages. Examples of the packages of the nonvolatile memory 100 or the memory system 10 include Package on Package (PoP), Ball Grid Arrays (BGA), Chip Scale Packages (CSP), Plastic Leaded Chip Carrier (PLCC), Plastic Dual In-line Package (PDIP), Die in Waffle Pack, Die in Wafer Form, Chip On Board (COB), Ceramic Dual In-line Package (CERDIP), Plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), System In Package (SIP), Multi Chip Package (MCP), Wafer-level Fabricated Package (WFP), and Wafer-level Processed Stack Package (WSP).

Hereinafter, for the sake of simplicity, a NAND flash memory device will be described as one example of a much broader range of device types that may be implemented according to various embodiments of the inventive concept. That is, it will be assumed for purposes of illustration and explanation that the nonvolatile memory 100 is a NAND flash memory. However, the inventive concept is not limited to only NAND flash memory. At least other types of nonvolatile memory devices including ROMs, PROMs, EPROMs, EEPROMs, flash memories, PRAMs, MRAMs, RRAMs, and FRAMs might be used in other embodiments of the inventive concept.

Figure 2:
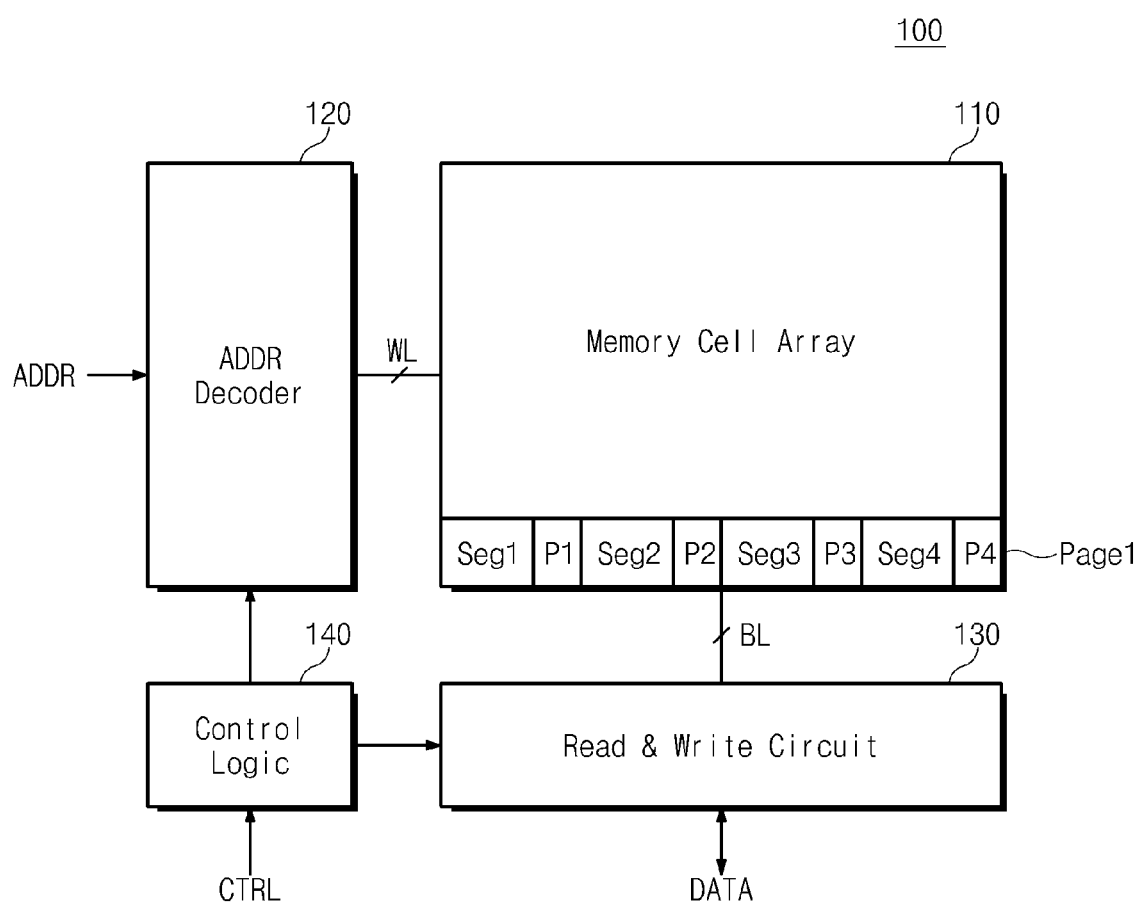
FIG. 2 is a block diagram of a nonvolatile memory of FIG. 1.

FIG. 2 is a block diagram further illustrating the flash memory 100 of FIG. 1. The flash memory 100 comprises a memory cell array 110, an address decoder 120, a read/write circuit 130, and a control logic circuit 140.

The memory cell array 110 is connected through word lines WL to the address decoder 120 and is connected through bit lines BL to the read/write circuit 130. The memory cell array 110 includes a plurality of memory cells. For example, the rows of the memory cells are connected to the word lines WL, and the columns of the memory cells are connected to the bit lines BL. For example, the memory cells are configured to store one or more bits per cell.

The address decoder 120 is connected through the word lines WL to the memory cell array 110. The address decoder 120 operates in response to the control of the control logic circuit 140. The address decoder 120 receives an address ADDR from an external device. For example, the address ADDR is received from the controller 200 of FIG. 1.

The address decoder 120 decodes a row address among the received addresses ADDR to select the word lines WL. The address decoder 120 decodes a column address among the received addresses ADDR and transfers the same to the read/write circuit 130. For example, the address decoder 120 includes a row decoder, a column decoder, and an address buffer.

The read/write circuit 130 is connected through the bit lines BL to the memory cell array 110. For example, the read/write circuit 130 exchanges data with the controller 200 of FIG. 1. The read/write circuit 130 operates in response to the control of the control logic circuit 140. The read/write circuit 130 receives the decoded column address from the address decoder 120 to select the bit lines BL.

For example, the read/write circuit 130 receives data from the controller 200 and stores the received data in the memory cell array 110. As another example, the read/write circuit 130 reads data from the memory cell array 110 and transfers the read data to the controller. As another example, the read/write circuit 130 reads data form a first storage region of the memory cell array 110 and writes the read data in a second storage region of the memory cell array 110. For example, the read/write circuit 130 performs a copy-back operation.

For example, the read/write circuit 130 includes a page buffer, a column selection circuit, and a data buffer. As another example, the read/write circuit 130 includes a sense amplifier, a write driver, a column selection circuit, and a data buffer.

The control logic circuit 140 is connected to the address decoder 120 and the read/write circuit 130. The control logic circuit 140 controls an overall operation of the flash memory 100. The control logic circuit 140 operates in response to a control signal CTRL received from an external device. For example, the control signal CTRL is received from the controller 200 of FIG. 1.

The flash memory 100 performs a read/write operation on a first unit basis. For example, it is assumed in the following description that the "first unit" is a first page (e.g., Page 1). As conceptually illustrated in FIG. 2, the first exemplary page (Page 1) includes "second unit" data (e.g., segments Seg1 through Seg4) along with corresponding parity data (e.g., parity data sets P1 through P4). Thus, in the illustrated example of FIG. 2, it is assumed that the constituent second units forming each first unit are each respective data segments. Each segment Seg1~Seg4 may represent write data to be stored in the memory cell array 110 and/or read data requested by the host through controller 200.

For example, the segments Seg1~Seg4 may be defined data access units identified by the host. Thus, the segments Seg1~Seg4 may be respective data sectors. The respective parity data sets (or "parities") P1~P4 may be generated by operation of the controller 200 in relation to the respective segments Seg1~Seg4. Thus, in the illustrated example of FIG. 2, the parities P1~P4 are exemplary of a range of error detection/correction (ECC) data that may be derived using conventionally understood ECC techniques from the segments Seg1~Seg4.

As illustrated in FIG. 2, the specifically illustrated first page (Page 1) includes four segments Seg1~Seg4 and the corresponding parities P1~P4. However, it will be readily understood by those skilled in the art that the structure of the first page (Page 1) need not limited to only four segments Seg1~Seg4 and corresponding parities P1~P4.

As is also illustrated in FIG. 2, the parities P1~P4 corresponding to the segments Seg1~Seg4 are stored in a distributed manner. However, it will again be understood by those skilled in the art that the disposition of the parities P1~P4 need not limited to this distributed manner. For example, it will be understood that the parities P1~P4 may be collectively stored in a designated storage region for the segments Seg1~Seg4 and in a logically or physically divided storage region.

Figure 3:
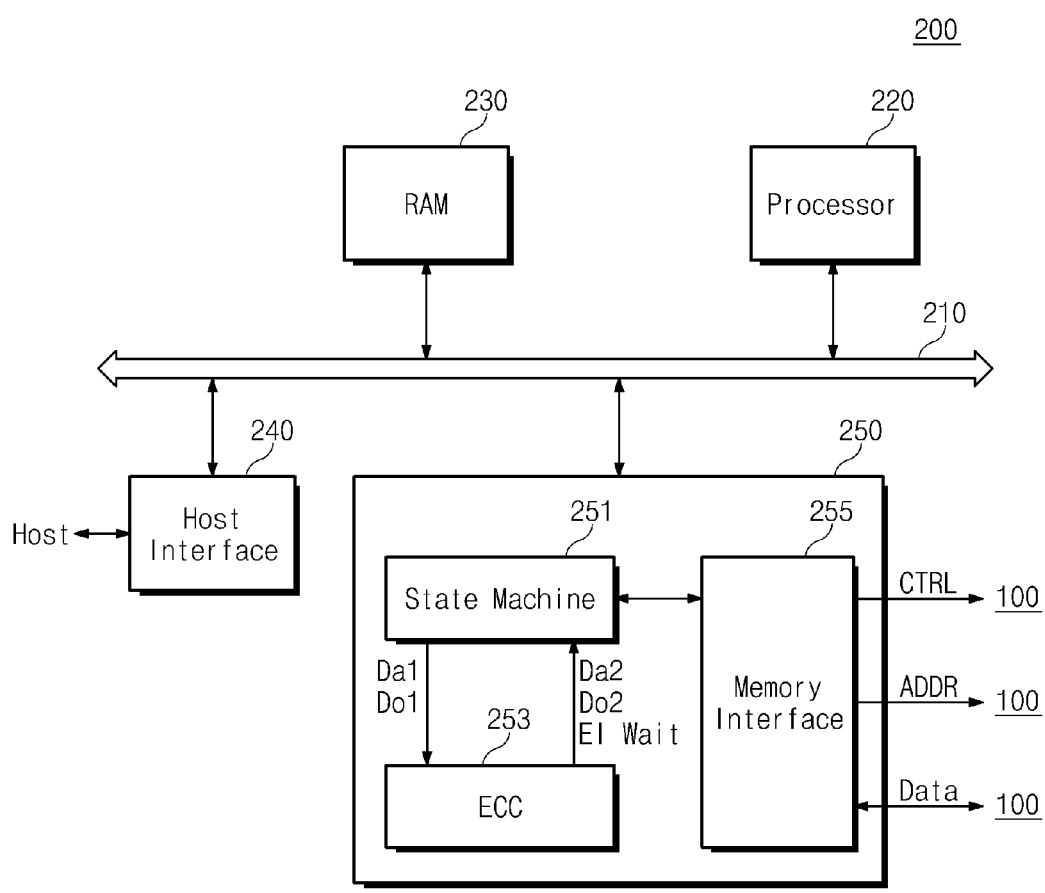
FIG. 3 is a block diagram of a controller of FIG. 1.

FIG. 3 is a block diagram further illustrating the controller 200 of FIG. 1. In the illustrated embodiment, the controller 200 comprises a system bus 210, a processor 220, a RAM 230, a host interface 240, and a control unit 250.

The system bus 210 provides a channel between the components of the controller 200.

The processor 220 controls an overall operation of the controller 200. For example, the processor 220 is configured to drive a firmware for controlling the controller 200 and the flash memory 100. For example, the processor 220 is configured to drive a host driver and a flash translation layer.

The RAM 230 may be used as a working memory of the controller 200. For example, the processor 220 uses the RAM 230 to control the operations of the flash memory 100 and the controller 200. As another example, the RAM 230 is used as a buffer memory of the controller 200. For example, the RAM 230 includes nonvolatile memories such as DRAMs, SRAMs, and SDRAMs. As another example, the RAM 230 includes nonvolatile memories such as PRAMs, MRAMs, RRAMs, FRAMs, and NOR flash memories.

The host interface 240 may include a protocol for data exchange between the host and the controller 200. For example, the host interface 240 is configured to communicate with an external device (e.g., the host) through one of various interface protocols such as USB (Universal Serial Bus), MMC (Multimedia Card), PCI (Peripheral Component Interface), PCI-E (PCI-Express), ATA (Advanced Technology Attachment), Serial-ATA, Parallel-ATA, SCSI (Small Computer Small Interface), ESDI (Enhanced Small Disk Interface), and IDE (Integrated Drive Electronics).

The control unit 250 operates in response to the control of the processor 220. The control unit 250 is configured to communicate with the flash memory 100. For example, the control unit 250 is configured to control the data output to the flash memory 100. The control unit 250 is configured to control the data input from the flash memory 100. The control unit 250 is configured to control a read/write/erase operation of the flash memory 100. For example, the control unit 250 is configured to transfer a control signal CTRL and an address ADDR to the flash memory 100. The control unit 250 is configured to exchange data with the flash memory 100.

The control unit 250 is configured to detect and correct an error in data read from the flash memory 100. Particularly, in a copy-back operation, the control unit 250 is configured to detect and correct a read error in data retrieved from the flash memory 100. The copy-back operation is a common operation involving the reading of data from a first storage region (e.g., a first page) of the flash memory 100, and the writing of the read data in a second storage region (e.g., a second page) of the flash memory 100. The copy-back operation may be performed in response to a copy-back read command and a copy-back command.

For example, the control unit 250 may communicate a copy-back command to the flash memory 100. In response to the copy-back command, data is read from the flash memory 100 on a first unit (e.g., a page) basis. The read data is then communicated from the flash memory 100 to the control unit 250.

The control unit 250 runs an ECC operation on the read data received from the flash memory 100 on a second unit (e.g., a segment) basis, smaller than the first unit (e.g., page) basis. For example, it is assumed that second unit data (e.g., first and second segments) are received by the controller 250 from the flash memory 100 during a copy back operation. If an error is detected in the first segment, the control unit 250 will instruct the flash memory 100 to halt transmission of the second segment.

In order to correct the detected error in the first segment, the control unit 250 will request data corresponding to the detected error to the flash memory 100. For example, the control unit 250 may request the third unit data (e.g., a single byte) smaller than the second unit (e.g., segment). In response to the request from the control unit 250, the data corresponding to the detected error will be communicated from the flash memory 100 to the control unit 250 on a third unit (e.g., a byte) basis.

Upon receiving the data corresponding to the detected error from the flash memory 100, the control unit 250 may correct the detected error in the received data corresponding to the detected error. Thereafter, the controller 250 may communicate the error-corrected data back to the flash memory 100 on a third unit (e.g., byte) basis. Thereafter, the control unit 250 transfers a copy-back command to the flash memory 100. In response to the copy-back command, the error-corrected data may be written to (e.g.,) a second first unit (e.g., Page 2) of the flash memory 100 on a first unit basis.

It is further assumed that the third unit (e.g., a byte) represents the maximum amount of data that may be exchanged between the flash memory 100 and the controller 200 at one time. Thus, in order to communicate data on a second unit (e.g., segment) basis, the flash memory 100 and controller 200 must perform multiple data transmission operations, wherein each data transmission operation occurs on the third-unit (e.g., byte) basis.

Summarizing the foregoing, data is read from the flash memory 100 on a first unit (e.g., a page) basis. The read data is transmitted from the flash memory to the controller 200 on a second unit (e.g., segment) basis. And upon detecting an error in the received data, the detected error is corrected by exchanging data corresponding to the detected error on a third unit (e.g., a byte) basis between the flash memory 100 and the controller 200. Accordingly, it is possible to detect and correct an error in read data retrieved from a nonvolatile memory device using a random-in/random-out (RIRO) basis during in the copy-back operation.

Third unit (e.g., byte) sized data may be communicated between the flash memory 100 and the controller 200 a number of times in order to facilitate the correction of a detected error in the read data, said read data being provided from the flash memory 100 to the controller 200 on a first unit (e.g., page) basis, and the corresponding error-corrected read data being subsequently returned to the flash memory 100 from the controller 200 on a first unit (e.g., page) basis. The exact number of third unit (e.g., byte) sized data that must be exchanged will vary by design and/or the number of detected errors in the read data. Thus, it may be seen from the foregoing that a copy-back operation may be performed in certain embodiments of the inventive concept using a minimum of data input/output operations between the flash memory 100 and controller 200.

Returning to FIG. 3, the control unit 250 comprises a state machine 251, an error correction block 253, and a memory interface 255. The state machine 251 is configured to control an operation of the control unit 250. The state machine 251 is configured to communicate with the error correction block 253, the memory interface 255 and the system bus 210.

The state machine 251 is configured to transmit payload data Da1 and a corresponding control signal Do1 to the error correction block 253. For example, the payload data Da1 may include read data received from the flash memory 100 via the memory interface 255. As another example, the payload data Da1 may include write data received from the host through the host interface 240. The control signal Do1 may be a signal indicating that the state machine 251 has performed an error correction operation. The error correction operation of the state machine 251 will be described later in some additional detail with reference to FIGS. 4 through 9.

The state machine 251 is configured to receive return payload data Da2, a corresponding return control signal Do2, error position information EI, and a wait signal Wait from the error correction block 253. For example, the return payload data Da2 may be an error-corrected version of the read data previously received from the flash memory 100 as corrected by the error correction block 253. As another example, the return payload data Da2 may include the write data received from the host along with ECC data (e.g., a parity data set) generated by the error correction block 253.

The return control signal Do2 may be a signal indicating that an error in the read data received from the flash memory 100 has been corrected. The error position information EI may be information indicating the location of an error in the read data received from the flash memory 100. The wait signal Wait may be a signal that is activated when an error is detected in data received from the flash memory 100. The state machine 251 may be configured to perform an ECC operation in response to the return control signal Do2, the error position information EI and the wait signal Wait. An exemplary ECC operation that may be performed by the state machine 251 will be described later in some additional detail with reference to FIGS. 4 through 9.

The error correction block 253 includes an error control code. In the illustrated embodiment of FIG. 3, the error correction block 253 is assumed to be configured to generate parity data by means of an error control code (ECC) on the basis of received payload data Da1. The error correction block 253 is configured to detect and correct error(s) in the received payload data Da1 using the received parity data. For example, the error correction block 253 may be configured to perform a syndrome operation using the received parity data and payload data. The error correction block 253 may be configured to correct a detected error in the payload data via the applied syndrome operation.

For example, the error correction block 253 is configured to perform a Euclid & Chien Search (EC) algorithm. The error correction block 253 is configured to detect the error position information EI by performing an EC algorithm. In an error correction operation, the error correction block 253 is configured to generate the control signal Do2, the error position information EI and the wait signal Wait.

The memory interface 255 operates in response to the control of the state machine 251. The memory interface 255 is configured to communicate with the state machine 251. The memory interface 255 is configured to include a protocol for communicating with the flash memory 100. For example, the memory interface 255 is configured to include a NAND protocol. For example, the memory interface 255 is configured to transmit a control signal CTRL and an address ADDR to the flash memory 100. For example, the memory interface 255 is configured to exchange data with the flash memory 100.

Hereinafter, a write operation for the memory system 10 will be described with reference to FIGS. 1 2, and 3.

During a write operation, write data is transmitted from the host to the host interface 240. The write data received through the host interface 240 is transferred to the error correction block 253 as payload data. For example, the write data may be transferred to the error correction block 253 using the system bus 210 and the state machine 251.

The error correction block 253 then generates parities related to the write data received from the host on a second unit (e.g., segment) basis. For example, it is assumed that write data has a first unit size (e.g., a page) as received in the flash memory 100 from the host. Thus, the write data received from the host is divided according to the second unit (e.g., segment) size. For example, the write data received from the host is assumed to be divided into the first to fourth segments (Seg1~Seg4) of FIG. 2. The error correction block 253 then generates corresponding ECC data (e.g., parities P1~P4) for each one of the first through fourth segments Seg1~Seg4 of write data.

The parities P1~P4 corresponding to the first to fourth segments Seg1~Seg4 are also transmitted to the flash memory 100. For example, the parities P1~P4 corresponding to the first to fourth segments Seg1~Seg4 may be transmitted to the flash memory 100 through the state machine 251 and the memory interface 255. The parities P1~P4 corresponding to the first to fourth segments Seg1~Seg4 are first stored in the read/write circuit 130 of the flash memory 100. The read/write circuit 130 then writes the parities P1~P4 corresponding to the first to fourth segments Seg1~Seg4 to a corresponding page (e.g., first page Page1) of the memory cell array 110.

It will be understood that the RAM 230 may be used to temporarily store the first to fourth segments Seg1~Seg4 in the write operation. That is, it will be understood that the controller 200 may use the RAM 230 to buffer the first to fourth segments Seg1~Seg4.

Hereinafter, a read operation for the memory system 10 will be described with reference to FIGS. 1, 2 and 3.

During a read operation, the read/write circuit 130 of the flash memory 100 retrieves read data and corresponding parities from the memory cell array 110. For example, the read/write circuit 130 retrieves read data and the corresponding parities on a first unit (e.g., page) basis. It is assumed that the first to fourth segments Seg1~Seg4 are read from the first page (Page1) of the memory cell array 110. The first to fourth segments Seg1~Seg4 and the parities P1~P4 are then communicated to the error correction block 253. For example, the first to fourth segments Seg1~Seg4 and the parities P1~P4 may be communicated to the error correction block 253 through the memory interface 255 and the state machine 251.

The error correction block 253 uses the received parities P1~P4 to detect whether or not an error is present in any one of the first to fourth segments Seg1~Seg4. Thus, in the working example, the error correction block 253 detects errors in the first through fourth segments Seg1~Seg4 on a second unit (e.g., segment) basis (i.e., on a segment by segment basis for the page sized block of read data). When an error is detected in any one of the first through fourth segments Seg1~Seg4, the error correction block 253 uses the corresponding one of the parities P1~P4 to corrects the detected error. The error-corrected read data may then be transmitted to the host. For example, the error-corrected first to fourth segments Seg1~Seg4 may be transmitted to the host through the state machine 251, the system bus 210 and the host interface 240.

It will be understood that the RAM 230 may be used to temporarily store the first to fourth segments Seg1~Seg4 in the read operation. That is, it will be understood that the RAM 230 may be used to buffer the first to fourth segments Seg1~Seg4.

Figure 4:
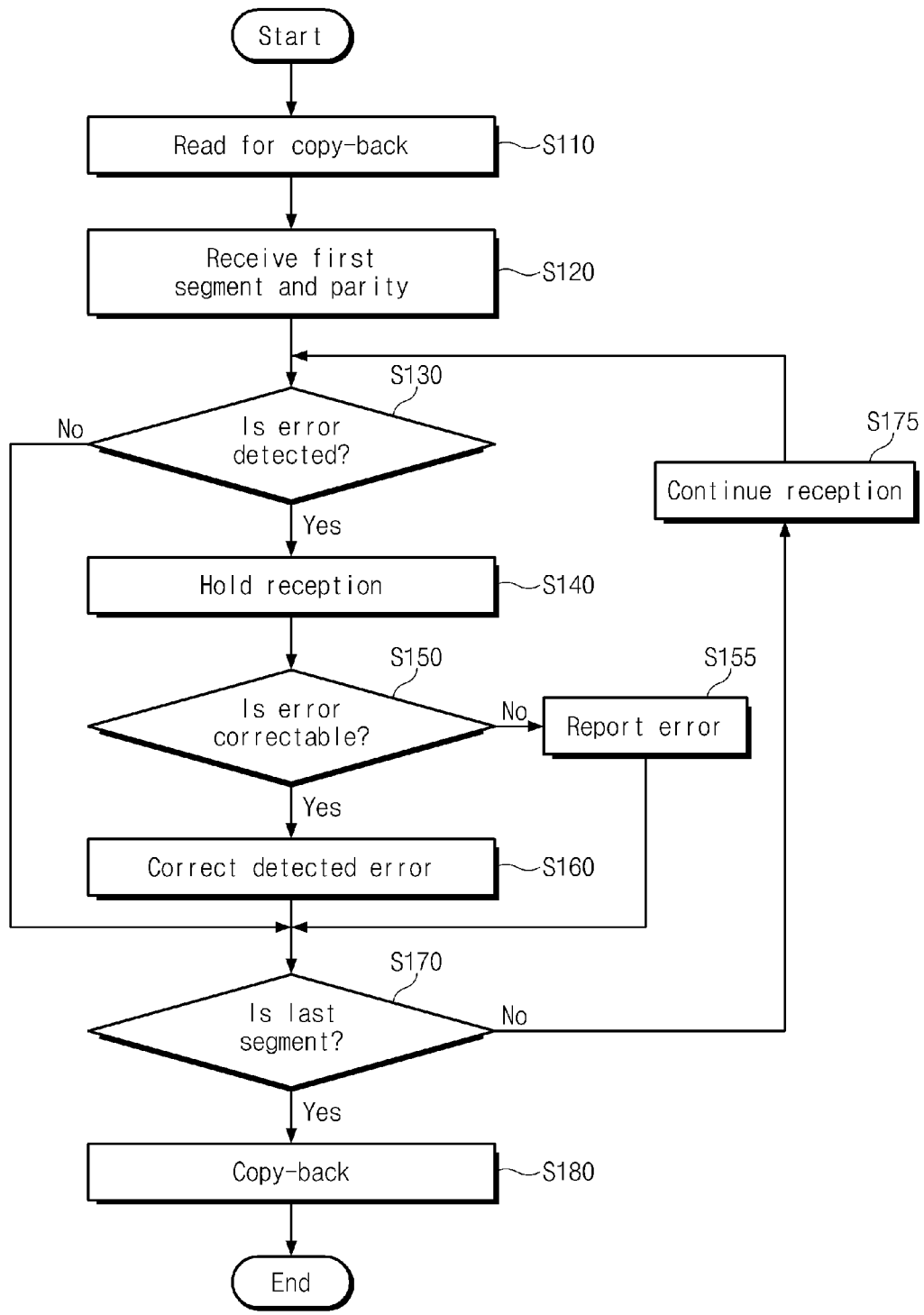
FIG. 4 is a flow chart summarizing a copy-back operation performed within the memory system of FIG. 1.
Figure 5:
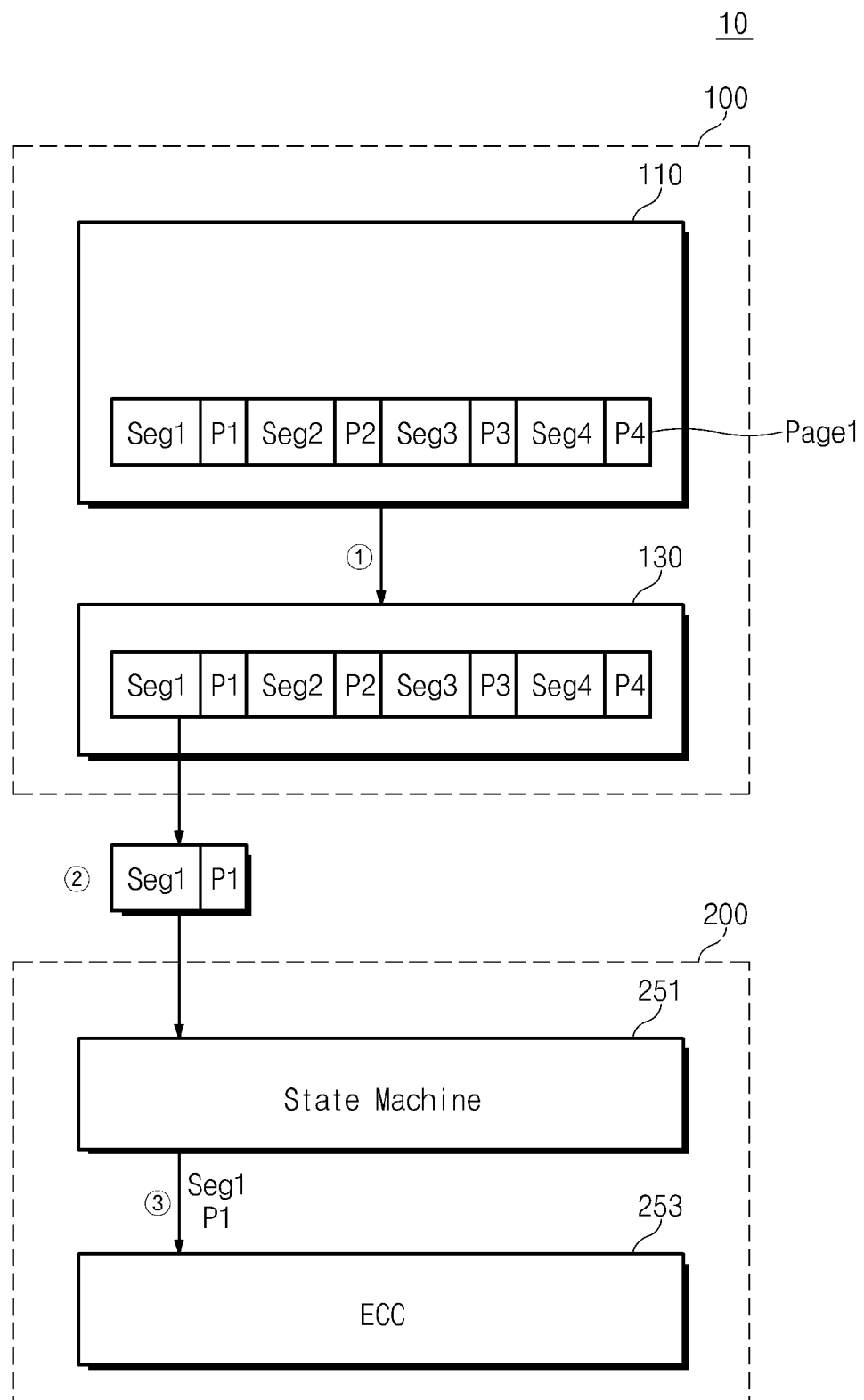
FIGS. 5 to 9 are block diagrams illustrating the states of the memory system according to the flow chart of FIG. 4.
Figure 6:
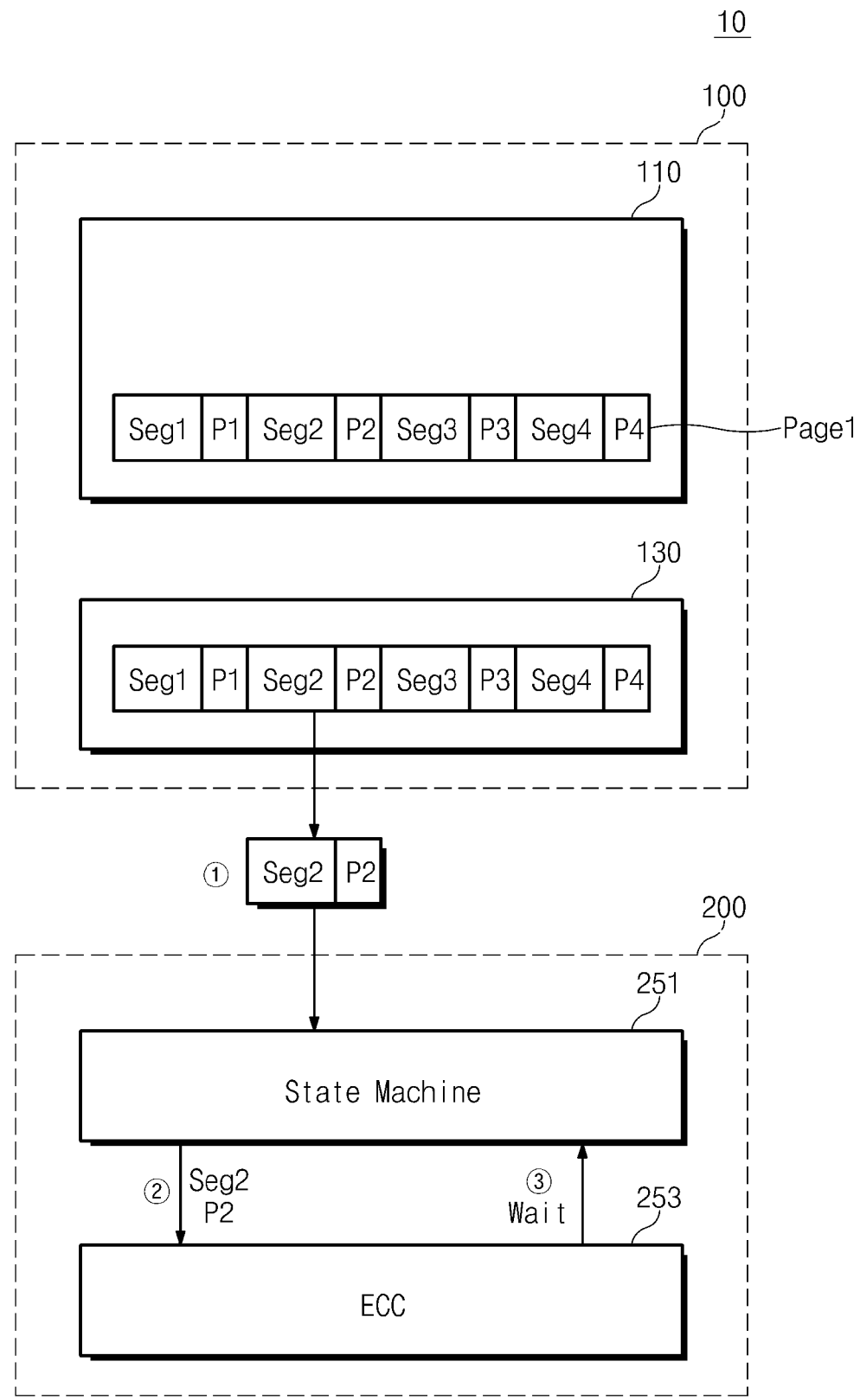

FIG. 4 is a flow chart summarizing a copy-back operation performed within the memory system 10 of FIG. 1. FIGS. 5 through 9 are block diagrams illustrating various states for the memory system 10 according to the flow chart of FIG. 4. For simplicity's sake, it is illustrated in FIGS. 5 through 9 that only the memory cell array 110 and the read/write circuit 130 are included in the flash memory 100. Also, it is illustrated in FIGS. 5 through 9 that only the state machine 251 and the error correction block 253 are included in the controller 200. Hereinafter, a copy-back operation performed within the memory system 10 will be described in some additional detail with reference to FIGS. 1 through 9.

In step S110, a copy-back read command is provided. For example, the copy-back read command is provided from the controller 200 to the flash memory 100. For example, the copy-back read command is provided from the control unit 250 of the controller 200 to the flash memory 100. For example, the copy-back read command is provided from the state machine 251 of the control unit 250 through the memory interface 255 to the flash memory 100.

In response to the copy-back read command, the read/write circuit 130 performs a read operation. The read/write circuit 130 performs a read operation in the first unit (e.g., page). For example, it is assumed that the parities P1~P4 and the first to fourth segments Seg1~Seg4 of the first page (Page1) are read. The read first to fourth segments Seg1~Seg4 and parities P1~P4 are stored in the read/write circuit 130 (see ⓪ of FIG. 5).

Thereafter, the read/write circuit 130 transmits the first to fourth segments Seg1~Seg4 and the parities P1~P4 to the controller 200. The first to fourth segments Seg1~Seg4 and the parities P1~P4 are sequentially transmitted to the controller 200. For example, the read/write circuit 130 transmits data in the order of from the first segment Seg1 and the parity P1 to the fourth segment Seg4 and the parity P4.

In step S120, the controller 200 receives the first segment Seg1 and the parity P1 from the flash memory 100. For example, the first segment Seg1 and the parity P1 are transmitted to the state machine 251 (see ② of FIG. 5).

Thereafter, an error in the received first segment Seg1 is checked. The state machine 251 transmits the first segment Seg1 and the parity P1, received from the flash memory 100, to the error correction block 253. The error correction block 253 uses the received first parity P1 to check an error in the received first segment Seg1 (see ③ of FIG. 5).

For example, the error correction block 253 performs a syndrome operation to detect an error in the received data (Seg1). For example, the error correction block 253 performs an EC algorithm to detect an error in the received data (Seg1). If an error is detected in the received data (Seg1), the error correction block 253 activates the wait signal Wait. The wait signal Wait is transmitted to the state machine 251.

In step S130, it is determined whether an error is detected. If an error is detected, the wait signal Wait is activated. For example, the wait signal Wait is transmitted from the error correction block 253 to the state machine 251.

If the wait signal Wait is received (i.e., if an error is detected in the received first segment Seg1), the state machine 251 performs step S150. If the wait signal Wait is not received (i.e., if an error is not detected in the received first segment Seg1), the state machine 251 performs step S170. For simplicity's sake, it is assumed that an error is not detected in the segment Seg1. That is, it is assumed that the state machine 251 performs step S170.

In step S170, it is determined whether the error-checked segment Seg1 is the last segment. If the error-checked segment Seg1 is the last segment, step S180 is performed. If the error-checked segment Seg1 is not the last segment, step S175 is performed. For simplicity's sake, it is assumed that the error-checked segment Seg1 is not the last segment.

In step S175, data reception continues. That is, the second segment Seg2 and the parity P2 are received from the flash memory 100 (see ① FIG. 6). The received second segment Seg2 and parity P2 are transmitted to the error correction block 253 (see ② FIG. 6). The error correction block 253 performs a syndrome operation and an EC algorithm to check an error in the received second segment Seg2.

In step S130, it is determined whether the wait signal Wait is activated. For example, it is assumed that an error is detected in the received second segment Seg2. That is, it is assumed that the error correction block 253 activates the wait signal Wait (see ③ FIG. 6).

In step S140, in response to the wait signal Wait, the controller 200 requests the flash memory 100 to stop data transmission. For example, the state machine 251 requests the flash memory 100 to stop transmission of data. In response to the request of the state machine 251, the flash memory 100 halts data transmission. For example, if an error is detected in the second segment Seg2, the flash memory 100 halts transmission of the third segment Seg3.

As another example, it is assumed that data transmitted from the flash memory 100 are received by the control unit 250 in a pipeline manner. The $(n+1)^{th}$ segment may be transmitted from the flash memory 100 while an error in the $n^{th}$ segment is being checked by the control unit 250. Herein, in response to the request of the stage machine 251, the flash memory 100 halts transmission of the $(n+2)^{th}$ segment.

For simplicity's sake, it is assumed that the flash memory 100 halts transmission of the third segment Seg3 in response to the request of the state machine 251 when an error is detected in the second segment Seg2. Thereafter, in steps S150 to S160, the state machine 251 corrects an error detected in the received second segment Seg2.

In step S150, it is determined whether the error is correctable. The controller 200 determines whether the detected error is correctable. For example, the state machine 251 compares the number of bits correctable by the error correction block 253 and the number of error bits detected in the received second segment Seg2. If the number of the detected error bits is greater than the number of the correctable bits, the error correction is impossible.

In this case, in step S155, the controller 200 generates an error report signal indicating that the error correction is impossible. For example, the state machine 251 generates an error report signal indicating that an uncorrectable error is generated. For example, the error report signal is transferred to the host. Thereafter, step S170 is performed.

As another example, instead of performing step S170, the controller 200 generates a signal for ending the copy-back operation. For example, instead of performing step S170, the stage machine 251 generates a signal for ending the copy-back operation. That is, it will be understood that the copy-back operation may be ended if an uncorrectable error is detected in the second segment Seg2.

If an error in the received second segment Seg2 is correctable, the state machine 251 performs step S160. In step S160, the controller 200 corrects the detected error. For example, the state machine 251 corrects the detected error.

Figure 7:
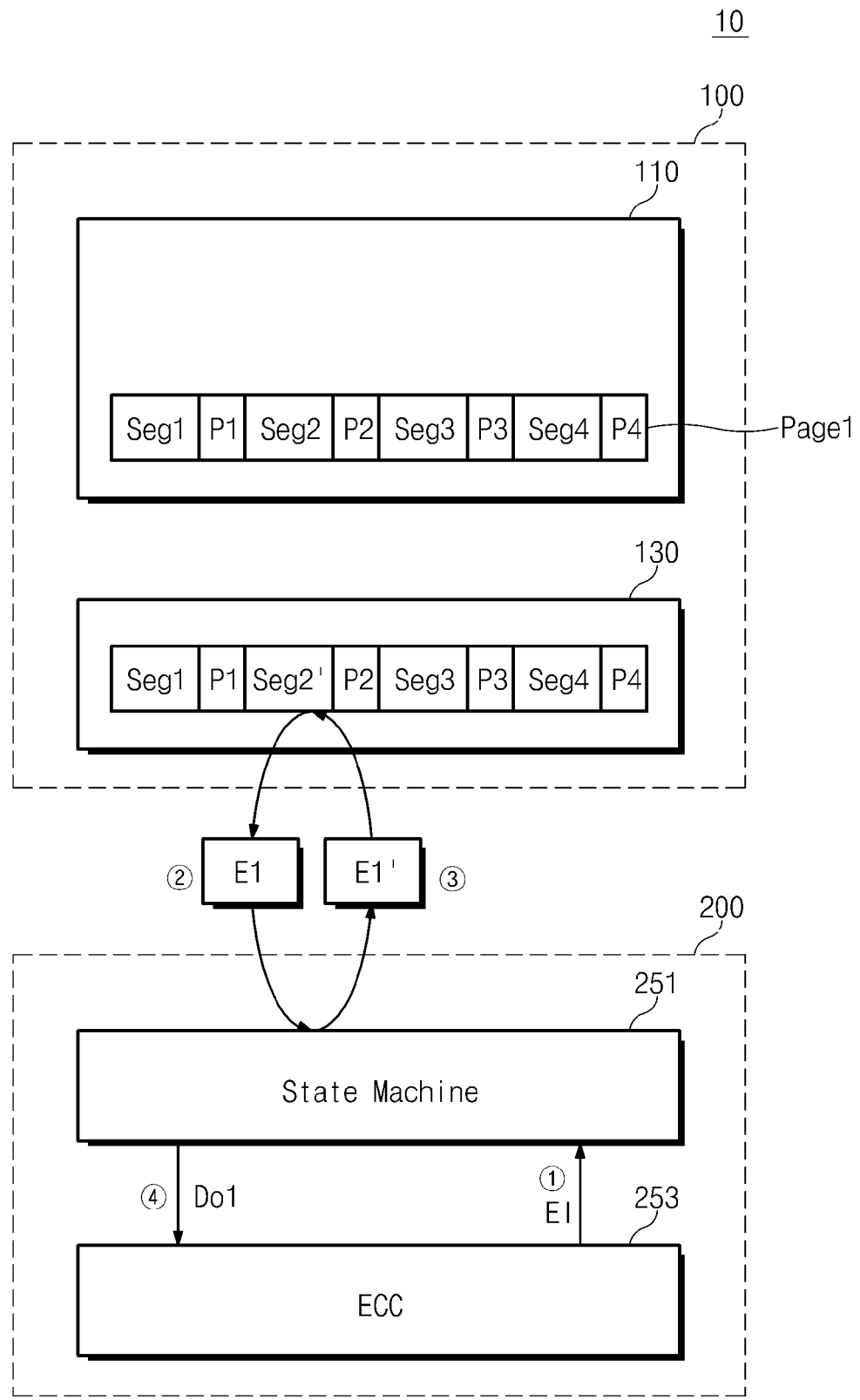
Figure 8:
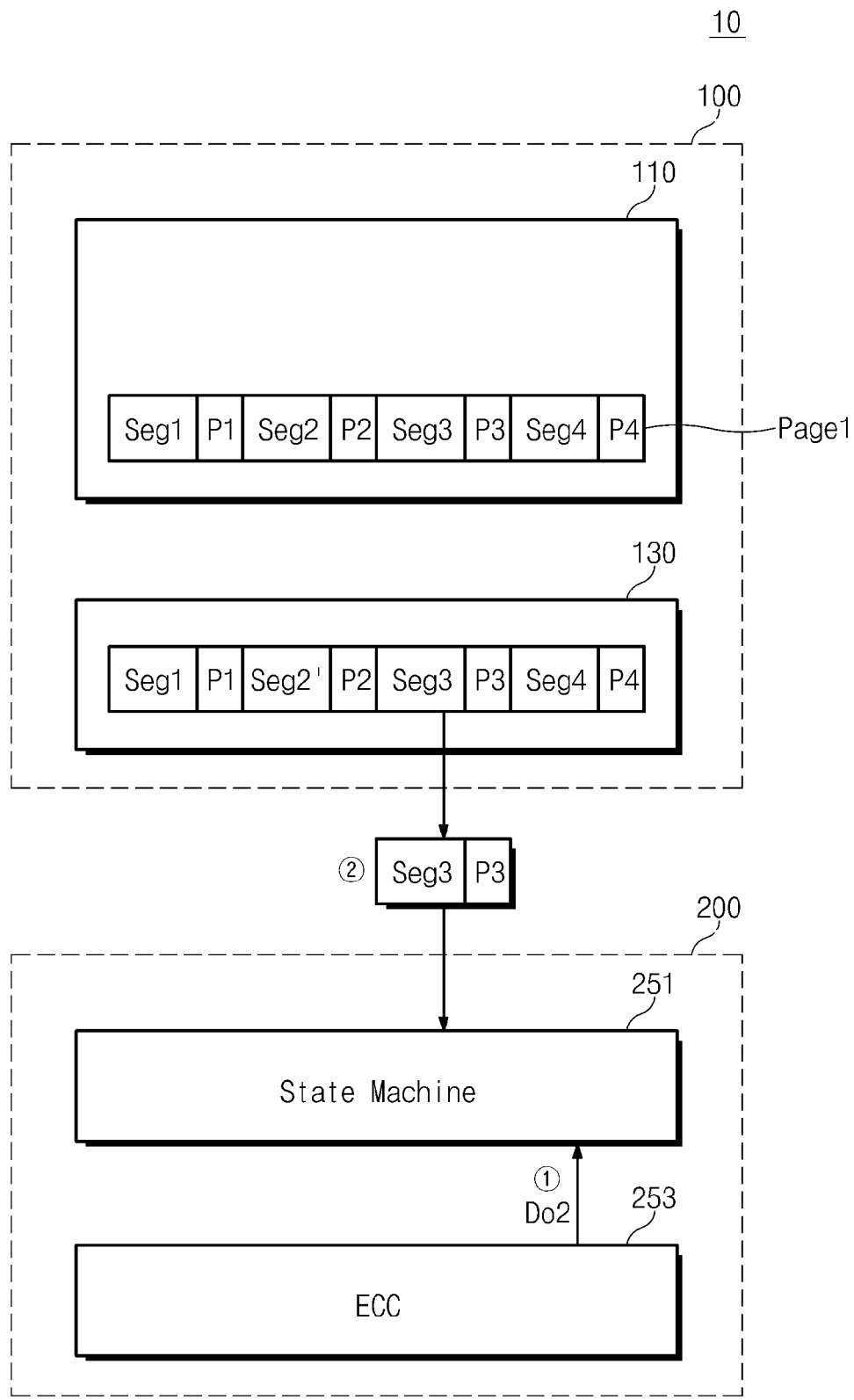

The error correction block 253 transmits the error position information EI, detected through an EC algorithm, to the state machine 251 (see ① FIG. 7). For example, the error position information EI includes error location information ERL and error position information ERP.

For example, the error location information ERL indicates which region of data of the second unit (e.g., segment) including the third units (e.g., bytes) an error is detected in. For example, the error location information ERL indicates which byte of the received second segment Seg2 an error is detected in.

For example, the error position information ERP indicates which region of data of the third unit (e.g., byte) an error is detected in. For example, the error position information ERP indicates which bit of the byte indicated by the error location information ERL an error is detected in.

The state machine 251 receives the error position information EI from the error correction block 253. On the basis of the error position information EI, the state machine 251 requests data E1, corresponding to the detected error among the received data (Seg2), from the flash memory 100. For example, the state machine 251 uses the error location information ERL to request data. For example, the state machine 251 requests data E1 on the third unit (e.g., byte) basis, indicated by the error location information ERL, from the flash memory 100.

In response to the request of the state machine 251, the corresponding data E1 are transmitted from the read/write circuit 130 of the flash memory 100 to the controller 200. For example, the corresponding data E1 are transmitted to the state machine 251 of the controller 200 (see ② FIG. 7). On the basis of the error position information EI, the state machine 251 corrects an error in the received data E1. For example, the state machine 251 uses the error position information ERP to correct an error in the corresponding data E1. For example, the state machine 251 is configured to invert the bit indicated by the error position information ERP.

The state machine 251 transmits error-corrected data E1' to the flash memory 100. For example, the error-corrected data E1' is transmitted to the read/write circuit 130 of the flash memory 100. The error-detected second segment Seg2 among the first to fourth segments Seg1~Seg4 stored in the read/write circuit 130 is updated using the error-corrected data E1'. That is, the second segment Seg2 stored in the read/write circuit 130 is updated into a second segment Seg2' (see ③ FIG. 7).

If an error in the second segment Seg2 stored in the read/write circuit 130 is corrected, the state machine 251 activates the control signal Do1. The control signal Do1 is transmitted to the error correction block 253. In response to the control signal Do1, the error correction block 253 transmits the error position information EI of an error, generated in another byte of the second segment Seg2, to the state machine 251. The error correction operation is repeated in response to the error location information ERL received from the error correction block 253.

For example, if an error is detected in two bytes of the second segment Seg2, the error location information ERL is generated two times. In response to the error location information ERL, the state machine 251 performs request for error data, correction of the received error data and transmission of the corrected data two times. Also, the state machine 251 activates the control signal Do1 two times.

The error correction block 253 retains the number of third units (e.g., bytes) error-detected in the received second segment Seg2 (hereinafter referred to as the number of errors). The error correction block 253 compares the number of errors and the number of transmissions of the control signal Do1.

If the number of transmissions of the control signal Do1 reaches the number of errors, it indicates that errors in the second segment Seg2 stored in the read/write circuit 130 are all corrected. In this case, the error correction block 253 activates the return control signal Do2 (see ① of FIG. 8). In response to the return control signal Do2, the state machine 251 performs step S170.

In step S170, the state machine 251 determines whether the error-corrected second segment Seg2' is the last segment. If the error-corrected second segment Seg2' is not the last segment, step S175 is performed. In step S175, data reception continues. For example, the flash memory 100 resumes transmission of the third segment Seg3 (see ② of FIG. 8).

As another example, it is assumed that the control unit 250 processes in a pipeline manner data received from the flash memory 100. Also, it is assumed that the $n^{th}$ segment is the last segment. In this case, it will be understood that there may be a case where an error in the $(n-1)^{th}$ segment is corrected by the control unit 250 and transmission of the $n^{th}$ segment from the flash memory 100 is completed. In this case, data transmission from the flash memory 100 is not resumed even when correction of an error in the $(n-1)^{th}$ segment is completed. The control unit 250 is configured to perform steps S130 to S170 on data of the $n^{th}$ segment received in a pipeline manner.

Thus, the control unit 250 is configured to stop/resume data transmission of the second unit (e.g., segment). Also, the control unit 250 is configured to communicate with the flash memory 100 on a third unit (e.g., byte) basis during error correction.

It is further assumed that error correction of the last segment (Seg4) is completed iteratively through steps S130 to S170 described above. In this case, data stored in the read/write circuit 130 of the flash memory 100 is error-corrected data. In step S170, the state machine 251 determines that an error in the last segment (Seg4) has been corrected. Thereafter, in step S180, the state machine 251 transmits a copy-back command to the flash memory 100.

Figure 9:
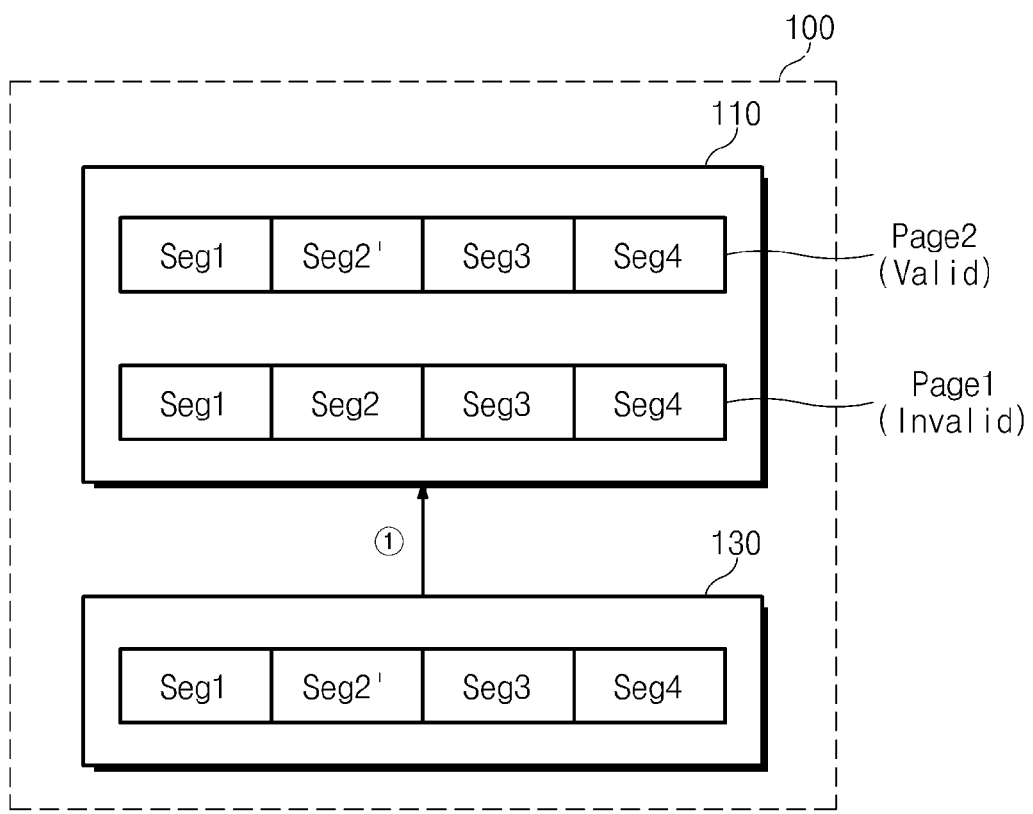
Figure 9:
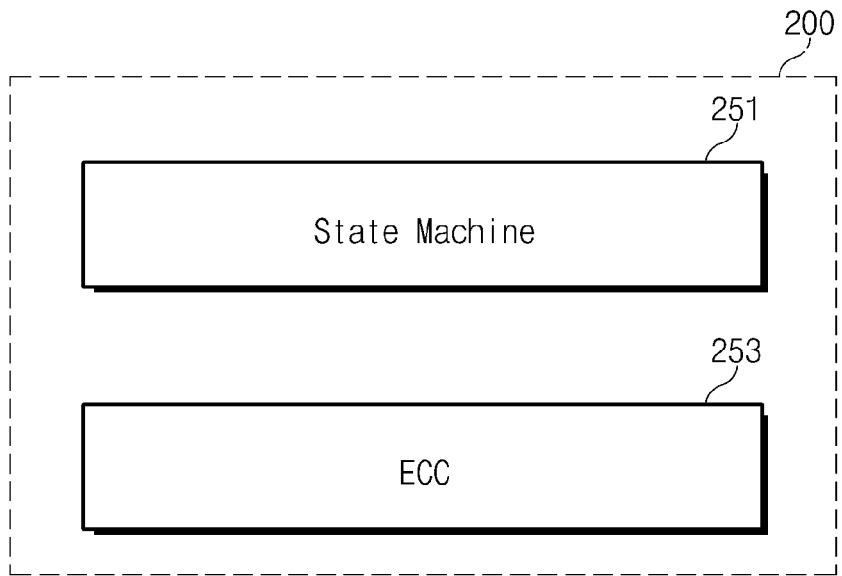

In response to the copy-back command, data stored in the read/write circuit 130 is written in the second page (Page2) of the memory cell array 110 (see ① of FIG. 9). The first page (Page1) is set to an invalid page, and the second page (Page2) is set to a valid page.

As described above, the data stored in the read/write circuit 130 is error-corrected data. Thus, it will be understood that the error-corrected data is written in the second page (Page2) of the memory cell array 110 during the copy-back operation.

As described above, according to certain embodiments of the inventive concept, it is possible to perform an error correction operation during a copy-back operation. In the error correction operation, data transmission from the flash memory 100 is halted/resumed on a second unit (e.g., segment) basis having a data bock size smaller than a first unit (e.g., page) basis used during read/write operations. When data transmission from the flash memory 100 is halted, data input/output associated with the flash memory 100 is performed on a third unit (e.g., byte) basis having a data block size smaller than the second unit (e.g., segment). Thus, an error detected in the read data may be corrected using one or more data input/output operations, each acting on a data block having the third unit size.

That is, the error correction operation may be performed using the RIRO technique applied to a data unit size smaller than a nominal data unit size for read/write operations (e.g., a data page) applied to the flash memory 100. It will be understood by those skilled in the art that the time taken to perform the error correction operation may be reduced by the foregoing approach, because only error-detected data among the read data must be exchanged (or re-exchanged) between the controller 200 and the flash memory 100.

Also, according to embodiments of the inventive concept, the ECC operation during the copy-back operation may be performed using a simple state machine 251 in conjunction with an error correction block 253 of conventional design. The ECC operation during the copy-back operation may thus be performed without the intervention of the processor 220 within controller 200. Processor 220 overhead and corresponding current may be recued accordingly.

Figure 10:
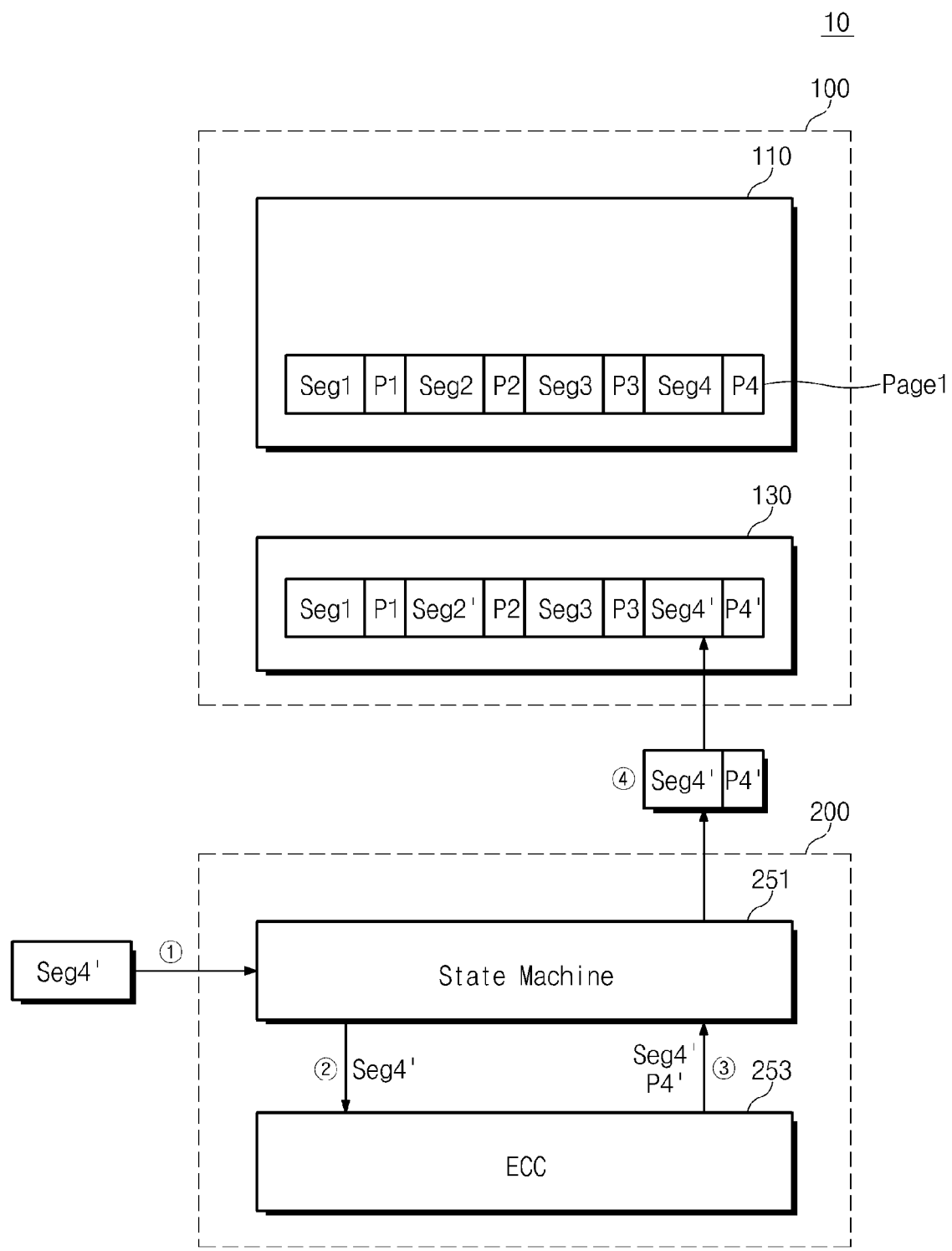
FIGS. 10 and 11 are diagrams illustrating a copy-back update operation of the memory system of FIG. 1.
Figure 11:
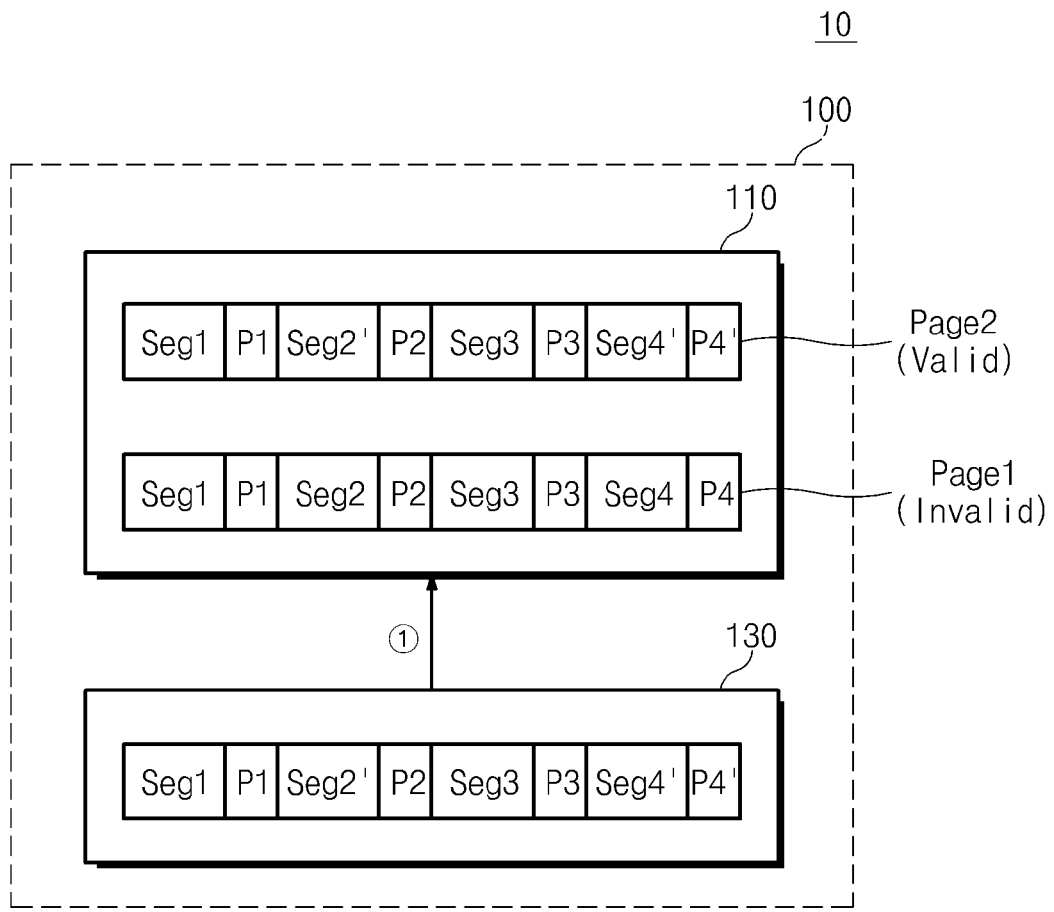
Figure 11:
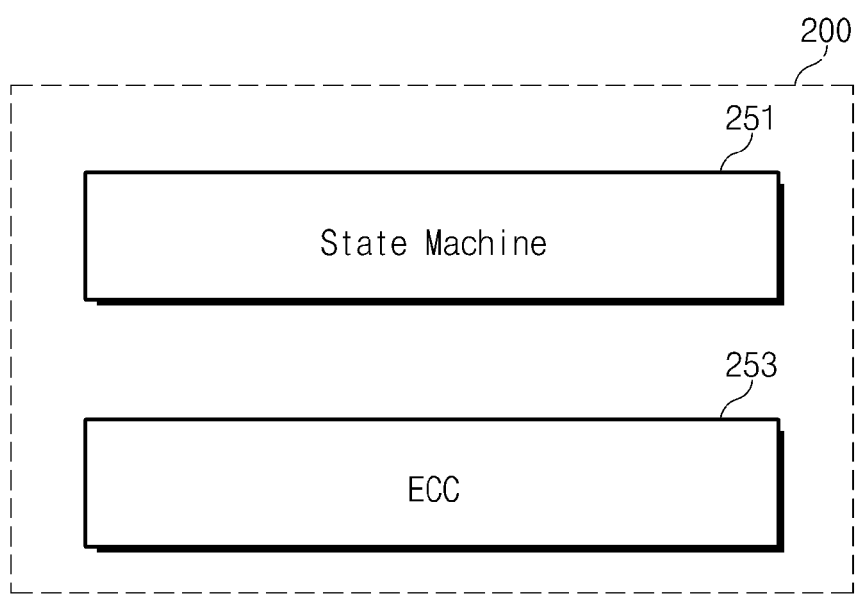

FIGS. 10 and 11 are diagrams illustrating a copy-back update operation performed within the memory system 10 of FIG. 1. For simplicity's sake, it is illustrated in FIGS. 10 and 11 that only the memory cell array 110 and the read/write circuit 130 are included in the flash memory 100. Also, it is illustrated in FIGS. 10 and 11 that only the state machine 251 and the error correction block 253 are included in the controller 200. Hereinafter, a copy-back update operation performed within the memory system 10 will be described in some additional detail with reference to FIGS. 10 and 11.

In this working example, it is assumed that the fourth segment Seg4 of the first page (Page1) of the flash memory 100 is to be updated. The control unit 250 transmits a copy-back read command for the first page (Page1) to the flash memory 100. In response to the copy-back read command, the read/write circuit 130 of the flash memory 100 reads the first to fourth segments Seg1~Seg4 of the first page (Page1) and the corresponding parities P1~P4. Thereafter, an error in the first to third segments Seg1~Seg3 stored in the read/write circuit 130 is corrected as described with reference to FIGS. 4 to 9.

Update data Seg4' of the fourth segment Seg4 are received from an external device. For example, the update data Seg4' are received from the host (see ① of FIG. 10). The state machine 251 transmits the update data Seg4' to the error correction block 253 (see ② of FIG. 10). The error correction block 253 generates a parity P4' of the update data Seg4'. The update data Seg4' and the corresponding parity P4' are transmitted to the state machine 251 (see ③ of FIG. 10).

The state machine 251 transmits the update data Seg4' and the parity P4' to the flash memory 100. For example, the update data Seg4' and the parity P4' are transmitted to the read/write circuit 130 of the flash memory 100 (see ④ of FIG. 10). The fourth segment Seg4 among the first to fourth segments Seg1~Seg4 stored in the read/write circuit 130 is updated into the update data Seg4'. The parity P4 corresponding to the fourth segment Seg4 is also updated into the parity P' received from the control unit 250.

In this case, an error in the data stored in the read/write circuit 130 has already been corrected. Also, the data stored in the read/write circuit 130 have already been updated by the update data received from the host. The state machine 251 transmits a copy-back command to the flash memory 100. In response to the copy-back command, the data stored in the read/write circuit 130 are written in the second page (Page2) of the memory cell array 110 (see ① of FIG. 11). That is, the error-corrected and updated data is written in the second page (Page2). The first page (Page1) is set to an invalid page, and the second page (Page2) is set to a valid page.

As described above, according to the embodiment of the inventive concept, the memory system 100 and the controller 200 can copy-back update data by means of the state machine 251 and the error correction block 253. Also, in the copy-back update operation, an error correction/update operation may be performed suing a RIRO scheme. Thus, the time required to perform error correction and corresponding update may be reduced.

Figure 12:
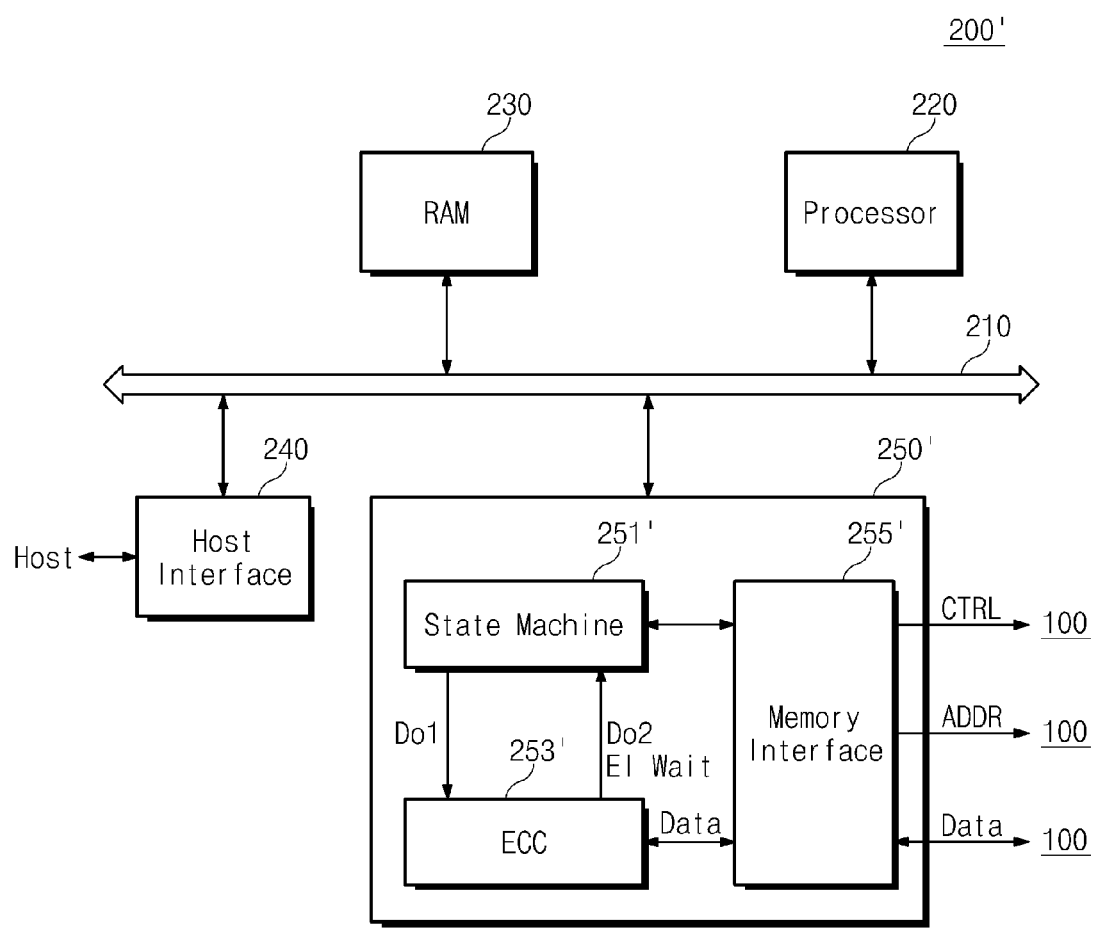
FIG. 12 is a block diagram illustrating another embodiment of the controller of FIG. 3.

FIG. 12 is a block diagram illustrating another embodiment of the controller 200 of FIG. 3.

Referring to FIG. 12, a controller 200' comprises a system bus 210, a processor 220, a RAM 230, a host interface 240, and a control unit 250'.

The system bus 210, the processor 220, the RAM 230, and the host interface 240 are configured in the same manner as described with reference to FIG. 4, and thus their detailed description will be omitted for conciseness.

The control unit 250' includes a state machine 251', an error correction block 253', and a memory interface 255'. The control unit 250' is configured in the same manner as the control unit 250 with the exception that the error correction block 253' communicates data with the memory interface 255'.

During a write operation, data transmitted from the host to the control unit 250' are directly transmitted to the error correction block 253' without passing through the state machine 251'. The error correction block 253' generates a parity of the received data. The error correction block 253' transmits the received data and the generated parity to the memory interface 255'. The memory interface 255' transmits the received data and parity to the flash memory 100.

During a read operation, the memory interface 255' receives data and a parity from the flash memory 100. The memory interface 255' transmits the received data and parity to the error correction block 253' without passing the same through the state machine 251'. The error correction block 253' corrects an error in the received data by means of the received parity. The error-corrected data is transmitted from the error correction block 253' to the system bus 210 without passing through the state machine 251'. The error-corrected data is transmitted through the host interface 240 to the host.

In a copy-back operation, data (e.g., the $n^{th}$ segment) and a parity (e.g., the $n^{th}$ parity) are transmitted from the flash memory 100 to the memory interface 255' in response to a copy-back read command. The memory interface 255' transmits the received $n^{th}$ segment and parity to the error correction block 253' without passing the same through the state machine 251'.

The error correction block 253' checks an error in the received $n^{th}$ segment by means of the received $n^{th}$ parity. If an error is detected in the $n^{th}$ segment, the error correction block 253' activates a wait signal Wait. In response to the wait signal Wait, the state machine 251' requests the flash memory 100 to stop data transmission.

The error correction block 253' transmits error position information EI to the state machine 251'. The state machine 251' requests data (e.g., byte) corresponding to the error position information EI from the flash memory 100. By means of the error position information EI, the state machine 251' corrects an error in the byte received from the flash memory 100. If the error is corrected, the state machine 251' activates a control signal Do1.

The error correction block 253' counts the number of transmissions of the control signal Do1. When the number of transmissions of the control signal Do1 reaches the number of errors detected in the $n^{th}$ segment, the error correction block 253' activates a return control signal Do2. In response to the return control signal Do2, the state machine 251' requests the flash memory 100 to resume data transmission.

As described above, data is transmitted to the state machine 251' only when the detected error is corrected. During read, write and copy-back operations without a detected error, payload data may be transmitted without passing through the state machine 251'. Thus, it will be understood that the data transmission times may be reduced within certain embodiments of the inventive concept.

Figure 13:
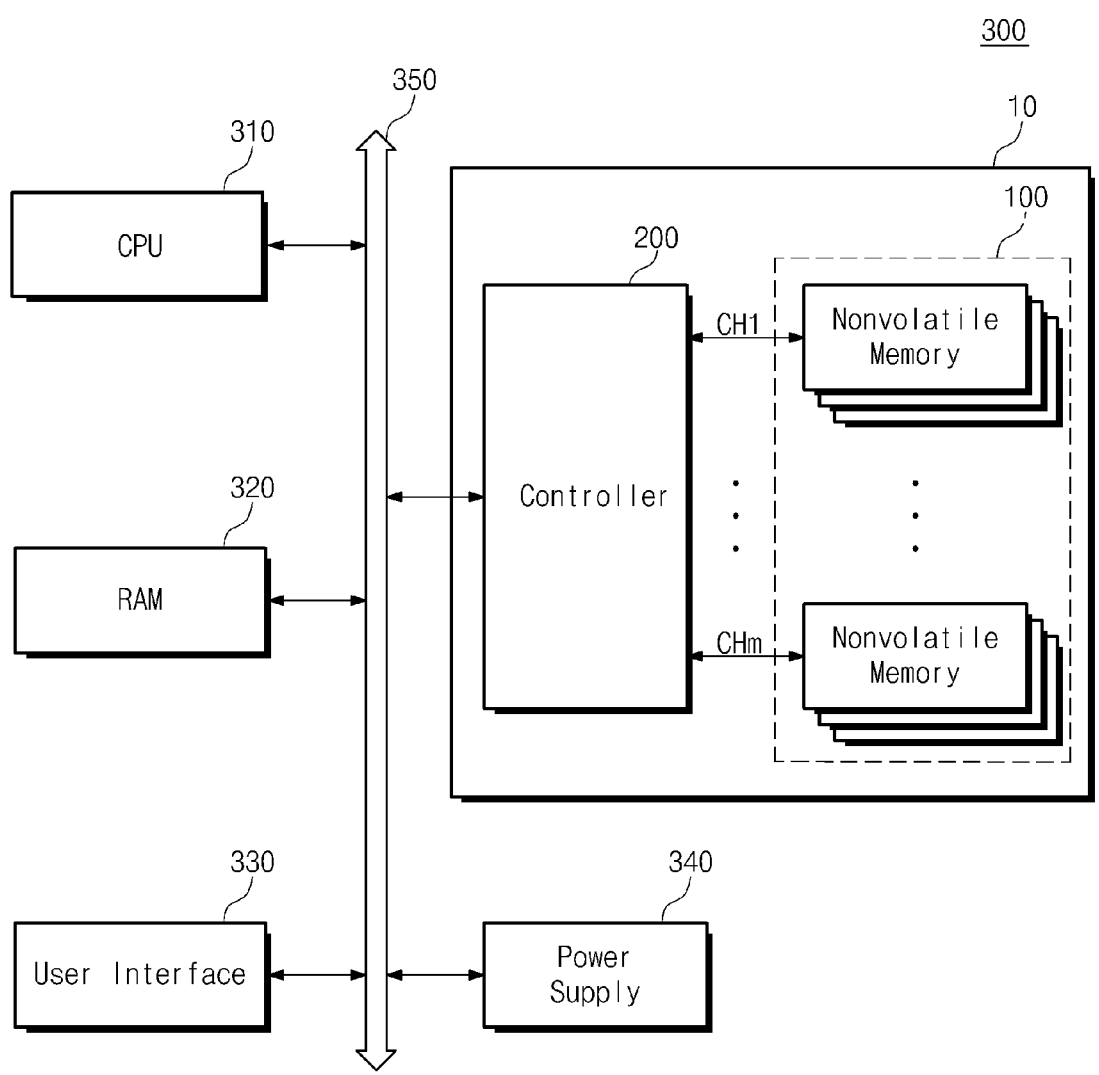
FIG. 13 is a block diagram of a computational system including the memory system of FIG. 1.

FIG. 13 is a block diagram of a computational system including the memory system 10 of FIG. 1.

Referring to FIG. 13, a computational system 300 according to an embodiment of the inventive concept includes a central processing unit (CPU) 310, a random access memory (RAM) 320, a user interface 330, a power supply unit 340, and a memory system 10.

The memory system 10 is electrically connected through a system bus 350 to the CPU 310, the RAM 320, the user interface 330, and the power supply unit 340. Data, which are provided through the user interface 330 or processed by the CPU 310, are stored in the memory system 10. The memory system 10 includes a controller 200 and a nonvolatile memory device 100.

For example, the memory system 10 constitutes a solid state driver (SSD). The memory system 10 may include a controller 200 and a plurality of nonvolatile memories 100. The nonvolatile memories 100 may be divided into a predetermined number of groups (e.g., 'm' groups). Each of the groups may be connected to the controller 200 to form a channel. The nonvolatile memories 100 and the controller 200 may be configured to operate as described with reference to FIGS. 1 to 11.

When the memory system 10 is provided as a solid state disk (SSD), the booting speed of the computational system 300 may increase remarkably. Although not illustrated in FIG. 13, those skilled in the art will readily understand that the computational system 300 may further include an application chipset and a camera image processor.

According to the inventive concept described above, an error can be corrected in a random-in random-out (RIRO) scheme. Also, an error correction function is provided by a state machine. Thus, it is possible to improve the error correction capability of a memory controller and a memory system including the same.

The above-disclosed subject matter is to be considered illustrative and not restrictive, and the appended claims are intended to cover all such modifications, enhancements, and other embodiments, which fall within the scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A memory system comprising:
   a nonvolatile memory including a memory cell array and a read/write circuit configured to retrieve first read data stored in the memory cell array during a read operation; and
   a controller configured to receive the first read data from the nonvolatile memory, perform an error detection and correction operation on the first read data,
   wherein upon detecting an error in a received portion of the first read data, the controller is further configured to halt further transmission of the first read data from the nonvolatile memory, perform the error detection and correction operation on the received portion of the first read data to correct the detected error, and after correcting the detected error in the received portion of the first read data, resume transmission of the first read data from the nonvolatile memory,
   wherein the read/write circuit is configured to retrieve the first read data on a first unit basis, the controller performs the error detection operation on the received portion of the first read data on a second unit basis, and the first unit is larger than the second unit,
   wherein upon detecting an error, the controller is further configured to receive second read data from the nonvolatile memory corresponding to the detected error of the received portion of the first read data on a third unit basis, the second unit being larger than the third unit, and correct the detected error in the received second read data corresponding to the detected error,
   wherein the controller comprises an error correction block configured to detect whether the received portion of the first read data contains an error and activating a wait signal upon detecting an error in the received portion of the first read data, and a state machine configured to halt the transmission of the first read data in response to the wait signal,
   wherein the error correction block is further configured upon detecting an error in the received portion of the first read data to provide error position information related to the detected error to the state machine, and the state machine is further configured to correct the detected error using the error position information,
   wherein the state machine is further configured following correction of the detected error to transmit a return control signal to the error correction block indicating correction of the detected error, and
   wherein the detected error includes a number of detected errors, and the error correction block is further configured to count a number of return control signal transmissions, and indicate when the counted number of return control signal transmissions is equal to the number of detected errors.

2. The memory system of claim 1, wherein the received portion of the first read data includes at least one second unit sized block of the first read data.

3. The memory system of claim 1, wherein the controller is further configured to generate error-corrected read data following correction of the detected error and provide the error-corrected read data to the read/write circuit on the third unit basis.

4. The memory system of claim 3, wherein the controller is further configured to receive complete first read data following resumption of transmission of the first read data, and upon receipt of the complete first read data the controller is configured to perform a copy-back operation in the nonvolatile memory.

5. The memory system of claim 1, wherein the nonvolatile memory and the controller are implemented to form a solid state drive (SSD).

6. A memory system comprising:
   a nonvolatile memory including a memory cell array and a read/write circuit configured to retrieve first read data stored on a page basis in the memory cell array during a read operation, wherein the page of first read data comprises a plurality of N segments and a corresponding plurality of N parities respectively derived from the plurality of N segments; and
   a controller configured to receive the page of first read data from the nonvolatile memory as transmitted on a segment by segment basis, and perform an error detection and correction operation on the first read data on the segment by segment basis for each one of the plurality of N segments,
   wherein upon detecting an error in an Mth segment of the plurality of N segments of the first read data, where M is less than N, the controller is further configured to halt further transmission of the remaining N-M segments of the first read data from the nonvolatile memory, perform the error detection and correction operation on the Mth segment to correct the detected error, and after correcting the detected error in the Mth segment, resume transmission of the page of first read data from the nonvolatile memory,
   wherein upon detecting an error, the controller is further configured to receive second read data from the nonvolatile memory corresponding to the detected error of the Mth segment on a predetermined unit basis, a size of the predetermined unit is less than a segment of the N segments, and correct the detected error in the received second read data corresponding to the detected error,
   wherein the controller comprises an error correction block configured to detect whether the Mth segment of the first read data contains an error and activating a wait signal upon detecting an error in the Mth segment, and a state machine configured to halt the transmission of the first read data in response to the wait signal,
   wherein the error correction block is further configured upon detecting an error in the Mth segment to provide error position information related to the detected error to the state machine, and the state machine is further configured to correct the detected error using the error position information, wherein the state machine is further configured following correction of the detected error to transmit a return control signal to the error correction block indicating correction of the detected error, and wherein the detected error includes a number of detected errors, and the error correction block is further configured to count a number of return control signal transmissions, and indicate when the counted number of return control signal transmissions is equal to the number of detected errors.

7. The memory system of claim 6, wherein the controller is further configured to generate an error-corrected data following correction of the detected error and provide the error-corrected data to the read/write circuit.

8. The memory system of claim 7, wherein the controller is further configured to receive remaining ones of the plurality of N segments following resumption of transmission of the first read data, and upon receipt of all of the plurality of N segments the controller is configured to perform a copy-back operation in the nonvolatile memory.

\* \* \* \* \*